Nov. 10, 1964        A. POURCHET        3,156,442
SHOCK-ABSORBING DEVICE FOR LANDINGS
Filed May 14, 1962        2 Sheets-Sheet 1

INVENTOR
Alfred POURCHET

ATTORNEYS

Nov. 10, 1964
A. POURCHET
3,156,442
SHOCK-ABSORBING DEVICE FOR LANDINGS
Filed May 14, 1962
2 Sheets-Sheet 2
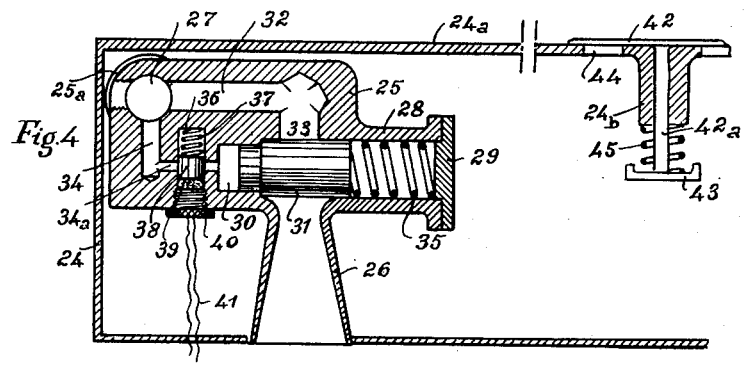
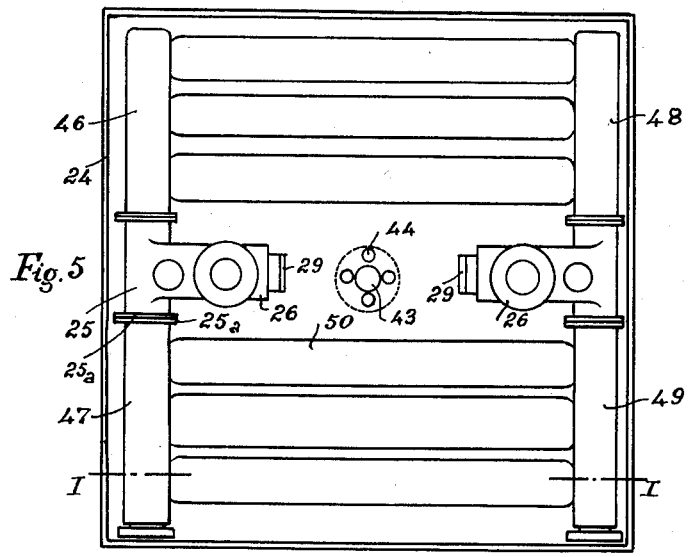
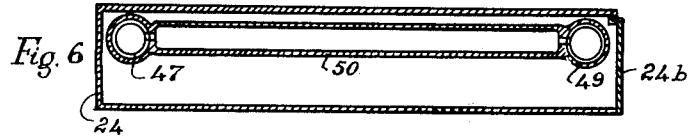
INVENTOR
Alfred POURCHET
ATTORNEYS

United States Patent Office 3,156,442
Patented Nov. 10, 1964

3,156,442
SHOCK-ABSORBING DEVICE FOR LANDINGS
Alfred Pourchet, 24 Parc de la Berangere,
Saint-Cloud, France
Filed May 14, 1962, Ser. No. 194,617
3 Claims. (Cl. 244—138)

This invention relates to parachutes and it is an important object of the invention to provide the parachutist himself or the platform carrying the load to be dropped, with a fluid reservoir under pressure with means for expanding the said fluid, willingly or automatically put into action above the ground when landing, thus producing a delay, obtaining a slower descent at the right moment braking the drop for an impact without shock.

A further object of the invention is to provide one or several subsonic nozzles of the expanding-contracting type, to send the fluid from the reservoir under pressure or fluid inductor in the axis of the convergent of the nozzle and to drive a certain quantity of induced air brought from the outside by the said fluid and to provide for supple and retractable means under the load, set in action at the moment of landing, producing through air-expansion, a shock-absorbing cushion of short duration but efficient, between the lower part of the load and the ground.

Another object of the invention is to provide one or several supersonic nozzles of the contracting-expanding type with means for instantaneously putting the said nozzles into action very close to the ground, to produce directly, through reaction on the ground, a shock absorption of the load dropped with an important yet supportable deceleration for parachutist or load.

Therefore the invention consists in the structure of parts and in their combination substantially as hereinafter described and claimed.

In the accompanying drawings, which form a part of this specification:

FIG. 4 is a longitudinal section of a nozzle device with its valve-control;

FIG. 5 is an outside view of a chamber or platform element with fluid reservoirs and FIG. 6 is a section along I—I of FIG. 5.

Figure 1:
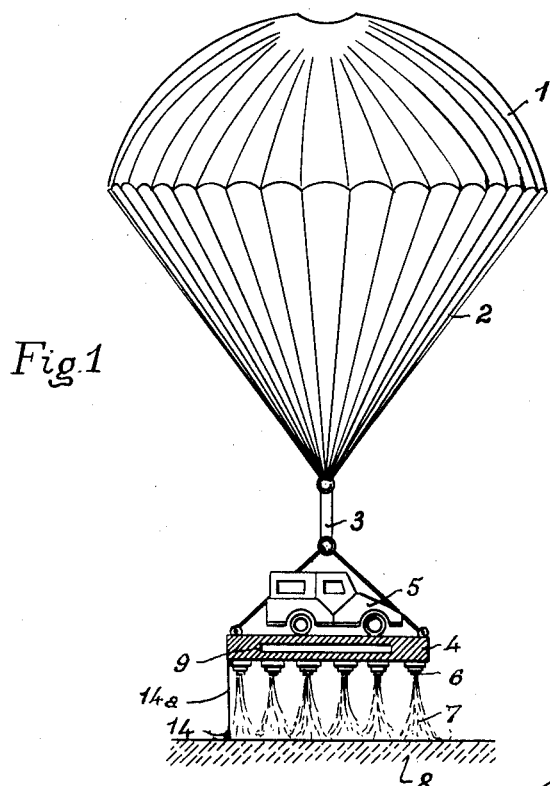
FIG. 1 represents an open parachute dropping a vehicle put on a platform.

According to FIG. 1, an opened parachute 1, of nylon textile or other material, is connected by a certain number of rigging lines to an extension 3 to which, by usual means, is fixed a platform 4, carrying a vehicle 5 to be dropped. Under the platform are shown expanded yet retractable tubes 6, driving out air to form a cushion 7 between the under face of the platform 4a and ground 8. The platform can act as air reservoir under pressure or for any other gas such as by incorporating a suitable reservoir 9 therein. A probe, point or feeler 14 at the end of a wire 14a is provided, to ensure contact with the ground and setting in action of the air or gas ejector device.

Figure 2:
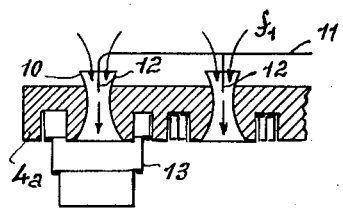
FIG. 2 is a partial longitudinal section with the nozzle device with exhaust tubes, one retracted, the other expanded.

FIG. 2 represents a possible realization detail of the ejector device. A certain number of venturis 10 are distributed on the carrier platform 4. By a duct 11, the gas under pressure is sent into the axis of the convergent 12 of the nozzle. The gas draws the outside air according to arrows $f_1$; the number, dimensions, distribution of the venturis, pressure and flow of the inductor gas are pre-established in relation to the load. Divergents come out in the rear of the lower face 4a in a cylindrical or tapering capacity 13 forming an air tube; that capacity can be expanded and is normally housed inside the body of the platform, retractable and expandable at will or automatically. It can be metallic of the telescopic type, inside being cylindrical or tapering and elements composing it fit one in the other. It can also be of plastic material.

Figure 3:
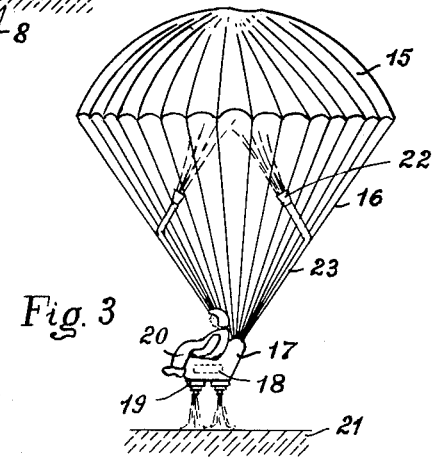
FIG. 3 shows the descent of a pilot in his ejectable seat.

FIG. 3 shows how a pilot is provided with an ejectable seat. Parachute 15 is connected by rigging lines 16 to the seat inside which is a gas container 18 under pressure. Under the lower face of the seat are arranged ejection tubes 19, of the foregoing type. The parachutist 20 can control the ejection device for forming the shock-absorbing cushion between the seat 17 and the ground 21.

Forms of fluid containers under pressure are a function of the load to be dropped; they can be detachable of standard type and filling can be performed rapidly, a few moments before their use.

The tubes or some of them can have automatically adjusted slopes or be adjusted by hand thus ensuring, at once, the formation of the absorber cushion and to create a component force providing for a displacement of the machine on the cushion; it then becomes possible to avoid landing in marshland, river, lake or any other obstacle and to ensure landing in suitable terrain. As for the parachutist, the device can be fixed to the gear or under the posterior of the man himself. Jets are set in action as already indicated.

The device can also be applied in "free-dropping" when it is hitched to the object for dropping, setting in action is as described.

The same means would allow the impact of landing of an aerodyne coming in contact with the ground; directing of the tubes makes sure of braking and facilitating the landing.

In an alternative execution, shown in FIG. 3, it is possible to use the same fluid ejection device 22, at the end of supple tubes, unfolding with the rigging lines 23 so as to direct the gas jet under the parachute dome 15. That means can be used alone or in combination with the device ensuring formation of the gas cushion.

In the FIG. 4 appears a chamber of parallelepipedic shape 24 of square or rectangular section, has two large parallel surfaces 24a, one of which forms a platform surface element and a lateral partition 24b swivel assembled, to be able to open the chamber and put the gas ejector device into it. That device, supersonic nozzle, has a body 25 connected to a piping for fluid feeding under pressure by flanges 25a; in the body is provided a line 27 and two ducts 32 and 33, the latter leading into a cylinder 30. In the said cylinder a check-piston can move 31 resting on a shoulder of the cylinder by a spring 35 housed in a cylindrical sleeve 28 of the body 25 closed by a cover 29. In the normal idle position, piston 31 closes the duct 33 which leads into the cylinder 30 opposite the nozzle 26. The valve ensuring displacement of piston 31, that is, passage of the fluid under high pressure contained in the containers, flowing through ducts 27–32 and the nozzle 26, is formed by a small capacity cylinder 36 provided in the body 25 connected with the high pressure piping 27 by a channel 34 and the cylinder 30 by a channel 34a; a piston 38 normally closes the passage of the fluid through 34–34a; it is supported by a spring 37 on the bottom of the cylinder and on the opposite side on an explosive charge 39 held in by a plug 40 possessing a passage for two current conductor wires. Wires 41 of the probe, not shown, are connected to the plug terminals. The probe which in the circuit, has a dry battery embodied, is put at the end of wires 41 of variable length but generally one meter or one meter fifty. When the probe touches the ground it closes the circuit thus causing explosion of the explosive charge; the piston 38 is driven upwards releasing passage of the fluid under pressure 34–34a towards the cylinder 30. Piston 31 in its turn, is subjected to high pressure and is displaced, thus clearing the passage for flow of the fluid in the nozzle. Discharge of the fluid is instantaneous, less than a second, deceleration being around "5g."

Thus shock-absorption is rapid and without harm for the user of the charge. Fluid is used without a reducing valve; air or gas or any source of energy such as powder may also be used. The thrust obtained varies with the generator pressure of the containers or the powder. To prevent rebound of the charge and the platform, it would be useful to fit a valve 42 on the openings 44 found on the chamber surface 24; pressure of air of the cushion formed under the platform can open the valve guided by its axis 42a in a valve guide 24c. A spring 45 resting on a flange 43 ensures return of the valve in the closed positon.

As shown in FIG. 5, control valves of the nozzle or nozzles are fitted on the pipings arranged parallel to the cross partitions of the chamber 24, in group of two, on each side of the nozzle bodies and their controls; containers 50 are joined crosswise to the said pipings so that the combination forms an autonomous moveable block which can be engaged in the chamber by opening the panel 24b. Fastening in the chamber is made in any suitable manner.

Several chambers like 24 should be joined to form a platform with adequate surface. They can be side by side, attached by known linking means. They can also be incorporated in a multicellular chassis each cell will have the chamber dimensions. The chassis can provide for grouping two, four or "n" housings and fixing of each chamber in a housing ensured by current type of assembling means. Thus a platform will have several chambers as many nozzles and probes as provided for in each chamber. If the platform approaches the ground with a certain slant, the probes act successively, their action not being simultaneous. It follows that by staggering their intervention, action of nozzles will tend to rectify the charge nearing the ground under the best landing conditions.

Supersonic type nozzles can be fitted adjustable, to produce an oblique thrust allowing the platform to be displaced on the ground.

What I claim is:

1. A shock absorbing device for smoothly landing a load when falling in free fall, comprising:
   (a) a load-carrying member;
   (b) a stabilizing parachute connected to the load carrying member to decelerate the latter during the fall;
   (c) a container of fluid under pressure in said member;
   (d) a plurality of subsonic type nozzles connected to said member and arranged to face downwardly when said parachute is open during falling of the member and load;
   (e) controllable connections between the container and the nozzles;
   (f) probe means adapted to hang from the load-carrying member and cooperating with said controllable connections as said probe means touches the ground to release fluid from said container through said nozzles to form a cushion of fluid of limited time duration between said member and the ground;
   (g) means, at the outlet of said nozzles, to prevent unduly rapid dispersion of the fluid cushion formed, beneath said load-carrying member.

2. A device as claimed in claim 1, wherein said means is a series of axially expandable and retractable sleeves mounted around the outlet of each nozzle which, when the load-carrying member is close to the ground, constitute a plurality of collapsible pressurized fluid chambers creating a fluid mat between the load-carrying member and the ground.

3. A device as claimed in claim 1 wherein said means is a series of axially expandable and retractable sleeves each formed of a plurality of coaxial telescopic cylindrical members adapted to nest into one another in collapsed condition of the sleeve; the outer one of said cylindrical members of each sleeve being secured to said load-carrying member in a groove thereof so that, in collapsed condition, the sleeves do not protrude from the bottom surface of the load-carrying member, whereby when the latter is close to the ground, the sleeves constitute a plurality of pressurized fluid chambers creating a fluid mat between the load-carrying member and the ground.

References Cited in the file of this patent
UNITED STATES PATENTS

| | | |
|---|---|---|
| 2,560,445 | Jackson | July 10, 1951 |
| 2,712,913 | Stanley | July 12, 1955 |

FOREIGN PATENTS

| | | |
|---|---|---|
| 441,415 | Italy | Nov. 2, 1948 |
| 968,948 | France | Dec. 18, 1950 |
| 1,237,101 | France | June 20, 1960 |